US009662814B2

(12) United States Patent
Strey et al.

(10) Patent No.: US 9,662,814 B2
(45) Date of Patent: May 30, 2017

(54) GENERATION OF NANODISPERSE INCLUSIONS IN A HIGH-VISCOSITY MATRIX

(75) Inventors: Reinhard Strey, Dormagen (DE); Alexander Müller, Köln (DE)

(73) Assignee: SUMTEQ GMBH, Köln (DE)

( * ) Notice: Subject to any disclaimer, the term of this patent is extended or adjusted under 35 U.S.C. 154(b) by 0 days.

(21) Appl. No.: 13/990,867

(22) PCT Filed: Dec. 1, 2011

(86) PCT No.: PCT/EP2011/071541
§ 371 (c)(1),
(2), (4) Date: Jun. 18, 2013

(87) PCT Pub. No.: WO2012/072755
PCT Pub. Date: Jun. 7, 2012

(65) Prior Publication Data
US 2013/0260133 A1    Oct. 3, 2013

(30) Foreign Application Priority Data

Dec. 1, 2010 (DE) .................. 10 2010 053 064

(51) Int. Cl.
B29C 44/20 (2006.01)
C08J 9/24 (2006.01)
B32B 3/26 (2006.01)

(52) U.S. Cl.
CPC .............. *B29C 44/206* (2013.01); *B32B 3/26* (2013.01); *C08J 9/24* (2013.01); *C08J 2203/08* (2013.01); *C08J 2205/042* (2013.01); *C08J 2205/044* (2013.01); *C08J 2325/06* (2013.01); *C08J 2333/06* (2013.01); *Y10T 428/249978* (2015.04)

(58) Field of Classification Search
CPC ............. C08J 2203/08; C08J 2201/032; B29C 44/206; B29C 44/356; B29C 44/3461; B29C 44/3492; B29C 44/3496; B29C 44/3469; B29C 67/222
USPC ....... 264/51, 42, 45.1, 45.6, 48, 49, 50, 413, 264/414, 415, 416, 37.14, 37.15, 37.16
See application file for complete search history.

(56) References Cited

U.S. PATENT DOCUMENTS

2004/0156911 A1* 8/2004 Chattopadhyay et al. ... 424/489
2005/0163904 A1* 7/2005 Walker et al. ............... 426/564
(Continued)

FOREIGN PATENT DOCUMENTS

FR         1 149 375 A    12/1957
JP       2008 231355 A    10/2008
(Continued)

OTHER PUBLICATIONS

Colton and Suh, "Nucleation of Microcellular Foam: Theory and Practice"; Polymer Engineering and Science, Mid-Apr. 1987, vol. 27, No. 7, pp. 500-503.
(Continued)

*Primary Examiner* — Stella Yi
(74) *Attorney, Agent, or Firm* — Norris McLaughlin & Marcus, P.A.

(57) ABSTRACT

The invention relates to a process for generating a porous material having homogeneous, gas-containing inclusions in the micrometer and sub-micrometer range, and also to the material produced by such process.

9 Claims, 12 Drawing Sheets

(56) References Cited

U.S. PATENT DOCUMENTS

| | | | |
|---|---|---|---|
| 2011/0174192 A1* | 7/2011 | Strey | A23G 3/52 |
| | | | 106/217.7 |
| 2013/0209520 A1* | 8/2013 | Ladavac et al. | 424/400 |

FOREIGN PATENT DOCUMENTS

| | | |
|---|---|---|
| WO | WO 2005 092959 A1 | 10/2005 |
| WO | 2013/075991 A1 | 5/2013 |

OTHER PUBLICATIONS

Colton and Suh, "The Nucleation of Microcellular Thermoplastic Foam with Additives: Part I: Theoretical Considerations"; Polymer Engineering and Science, Mid-Apr. 1987, vol. 27, No. 7, pp. 485-492.

Colton and Suh, "The Nucleation of Microcellular Thermoplastic Foam with Additives: Part II: Experimental Results and Discussion"; Polymer Engineering and Science, Mid-Apr. 1987, vol. 27, No. 7, pp. 493-499.

Goel and Beckman, "Generation of Microcellular Polymeric Foams Using Supercritical Carbon Dioxide. I: Effect of Pressure and Temperature on Nucleation"; Polymer Engineering and Science, Jul. 1994, vol. 34, No. 14, pp. 1137-1147.

Hansen and Ugelstad, "Particle Nucleation in Emulsion Polymerization. I. A Theory for Homogeneous Nucleation"; Journal of Polymer Science: Polymer Chemistry Edition, 1978, vol. 16, 1953-1979.

Hansen and Ugelstad, "Particle Nucleation in Emulsion Polymerization. II. Nucleation in Emulsifier-Free Systems Investigated by Seed Polymerization"; Journal of Polymer Science: Polymer Chemistry Edition, 1979, vol. 17, 3033-3045.

Hansen and Ugelstad, "Particle Nucleation in Emulsion Polymerization. III. Nucleation in Systems with Anionic Emulsifier Investigated by Seeded and Unseeded Polymerization"; Journal of Polymer Science: Polymer Chemistry Edition, 1979, vol. 17, 3047-3067.

Hansen and Ugelstad, "Particle Nucleation in Emulsion Polymerization. IV. Nucleation in Monomer Droplets"; Journal of Polymer Science: Polymer Chemistry Edition, 1979, vol. 17, 3069-3082.

M. Kahlweit, "Ageing of Precipitates by Ostwald Ripening", Angew Chem. Internat. Edit., 1965, vol. 4, No. 5, pp. 444-445.

Krause, "Polymer Nanofoams, Thesis University of Twente", 2001, The Netherlands, PrintPartners Ipskamp B.V., pp. 1-161.

Krause, et al., "Bicontinuous Nanoporous Polymers by Carbon Dioxide Foaming"; Macromolecules, 2001, 34, pp. 8792-8801.

Krause, et al., "Open Nanoporous Morphologies from Polymeric Blends by Carbon Dioxide Foaming"; Macromolecules, 2002, 35, pp. 1738-1745.

Krause, et al., "New ways to produce porous polymeric membranes by carbon dioxide foaming"; Desalination 144 (2002) pp. 5-7.

Meakin, "Steady State Droplet Coalescence", Physica A 171, 1991, pp. 1-18.

Ruiz et al., "Foaming Behaviour and Compressive Properties of Microcellular Nanostructured Polystyrene", Cellular Polymers, vol. 28, No. 6, 2009, pp. 363-385.

* cited by examiner

T = 45°C    T = 40°C    T = 35°C

GENERATION OF NANODISPERSE INCLUSIONS IN A HIGH-VISCOSITY MATRIX

This application is a 371 of PCT/EP2011/071541, filed Dec. 1, 2013, which claims foreign priority benefit under 35 U.S.C. §119 of the German Patent Application No. 10 2010 053 064.6 filed Dec. 1, 2010, the disclosures of which are incorporated herein by reference.

The invention relates to a process for producing a porous material containing homogeneous gas-containing inclusions in the micrometer and submicrometer range, and to the material produced by such process.

BACKGROUND OF THE INVENTION

In view of the increasing importance of climate protection and $CO_2$ emissions, the production of insulating materials has developed into an important branch of economy in recent decades. For example, an improved insulation of buildings would have the consequence that less thermal output, which accounts for about 40% of the energy consumption in Germany, would have to be produced, and thus $CO_2$ emissions would be reduced (Lünser, H., Dämmstoffe im Hochbau (2000), Wirtschaftsministerium Baden-Württemberg, Stuttgart). However, for these insulating materials to be employed in an economically reasonable way, the cost and expenditure of their production are critical factors.

In recent years, cellular materials or foams have proven to be particularly effective insulating materials. For such foams, the thermal conductivity $\lambda$ (in $Wm^{-1} K^{-1}$) is a critical factor. It expresses the capability of a material to transmit heat or to insulate. The thermal conductivity is composed of three factors (FIG. 1). These contributions are heat convection through the cell gas included in the pores of the foam, heat conduction through the web material (cellular matrix), and heat radiation (infrared radiation). FIG. 2 shows the different contributions to the overall thermal conductivity of a polystyrene foam (EPS). As can be seen, the cell gas makes the highest contribution in terms of heat convection.

A possible approach to reducing heat convection through the cell gas is the reduction of pore size, since the so-called Knudsen effect gains importance below a particular pore size. It implies that for gas molecules that are in a closed space whose diameter is smaller than twice the mean free path of the gas $\lambda_G$, the probability of collision with a wall is higher than that of collision with another gas molecule. Thus, a directed movement of the gas within the pores is no longer possible, and therefore heat convection by the gas breaks down in this limiting case (Seinfeld, J. H. and Pandis, S. N., Atmospheric Chemistry and Physics (1998), Wiley-Interscience, New York; Raed, K. and Gross, U., International Journal of Thermophysics 4: 1343-1356 (2009)). The mean free path for air at room temperature is $\lambda_G$=70 nm. Therefore, in order to utilize the Knudsen effect in insulation materials, pore sizes of below 140 nm would have to be realized. As compared to conventional foams, the thermal conductivity of such a nanocellular foam would be significantly lower, which is why it would be possible to work with significantly thinner insulation layers. This in turn would lead to a considerable saving of raw materials.

Several methods have been known to date for producing such nanostructured foams, the two most promising approaches being the sol-gel process used in aerogel production, and the principle of supercritical microemulsion expansion (POSME; Kistler, S., Journal of Chemical Physics 36: 52-64 (1932); Strey, R. et al., DE 10260815B4). An advantage of the sol-gel process is the fact that supercritical drying of the fixed gel is necessary in the last process step, which is why this method proves to require a high expenditure and thus to be cost-intensive. In comparison, the POSME method is considerably more cost-effective. In this method, a supercritical microemulsion characterized by a structure size of 1-100 nm is used as a template. In this way, the production of nanoporous materials should also be possible by fixing the microstructure and at the same time continuously expanding the microemulsion. However, it has not been possible to date to transfer the structure of the microemulsion to the foam without coarsening, because ageing phenomena occur during the fixing process, which coarsen the structure (Khazova, E., Doctoral Thesis (2010), Cologne University). Further, a surfactant is necessary for the thermodynamic stability of the microemulsion, which contaminates the product on the one hand and adds to the cost on the other. Therefore, presently, both the sol-gel process and the POSME method are unsuitable for industrial-scale applications.

Another approach for producing nanoporous materials could result from the use of polymer nanoparticle dispersions. By depositing the polymer from the corresponding dispersion, it is possible to produce amorphous packings of nanoparticles or nanoparticle crystals in which the polymer particles are in close packing. Through the action of a supercritical gas on such a packing of nanoparticles while heating is performed above the glass transition temperature of the polymer, gas can be entrapped in the gaps of the packing. Thus, nanodisperse inclusions would be formed in the polymer matrix. These inclusions can be foamed by subsequent expansion, whereby the production of nanoporous materials should be possible. As compared to the POSME method, this process has the advantage of dispensing with the use of surfactants. Further, thin nanoparticle layers, which can be subsequently foamed, can be applied to surfaces without difficulty by controlled deposition processes.

The object of the present invention is to show that the production of nanostructures polymers or foams is possible through the generation of nanodisperse inclusions in a high viscosity matrix.

SUMMARY OF THE INVENTION

It has now been found that nanoporous materials can be produced by generating nanodisperse inclusions of a supercritical gas in a highly viscous matrix. Starting from colloidal matrix crystals, namely thermoplast nanoparticle crystals, such as polystyrene and poly(methyl methacrylate) nanoparticle crystals, which can be prepared by emulsion polymerization and have particle radii of from 20 to 500 nm (determined by dynamic light scattering (DLS) and small-angle neutron scattering (SANS)), or from crystals of glass formers, such as glass, metals and other amorphous-solidifying substances (sugars), which are in a close packing of the particles in the colloidal crystal (detected by scanning-electron micrographs (SEM)), the glass transition temperature of the matrix material was lowered by adding $CO_2$ or $N_2$ under supercritical conditions. Upon the subsequent expansion, the glass transition temperature increased to its original value, which resulted in the fixation of a foam from the matrix material. In this way, foams having a pore size below 1 μm can be realized. The pore size and density of the polymer foam can be adjusted by appropriately selecting the polymer and the gas. Further, it could be shown experimentally that the solubility of the foaming agent in the matrix is not critical and need not be considered when selecting the matrix material and supercritical gas. Thus, the invention relates to:

(1) a process for producing a porous material containing homogeneous gas-containing inclusions in the micrometer and submicrometer range, comprising:
   (a) providing a compact packing of the starting material corresponding to the porous material, in which the individual particles contact one another (e.g., including in the form of a colloidal crystal);
   (b) adding a supercritical gas or supercritical mixture of gases;
   (c) surpassing the glass transition temperature ($T_g$) of the (starting) material with continuity inversion; and
   (d) releasing to atmospheric pressure and solidifying by falling below the $T_g$ of the (starting) material;
(2) a preferred embodiment of (1), wherein said porous material or starting material is a thermoplastic material; and
(3) a porous material containing homogeneous gas-containing inclusions in the micrometer and submicrometer range, obtainable by a process according to (1) or (2).

According to the invention, a supercritical fluid is referred to as a supercritical gas if both the temperature and the pressure are above the critical values, i.e., for $CO_2$, if $T > T_c = 30.97°$ C., $p > p_c = 73.75$ bar.

DETAILED DESCRIPTION OF THE INVENTION

Figure 1:
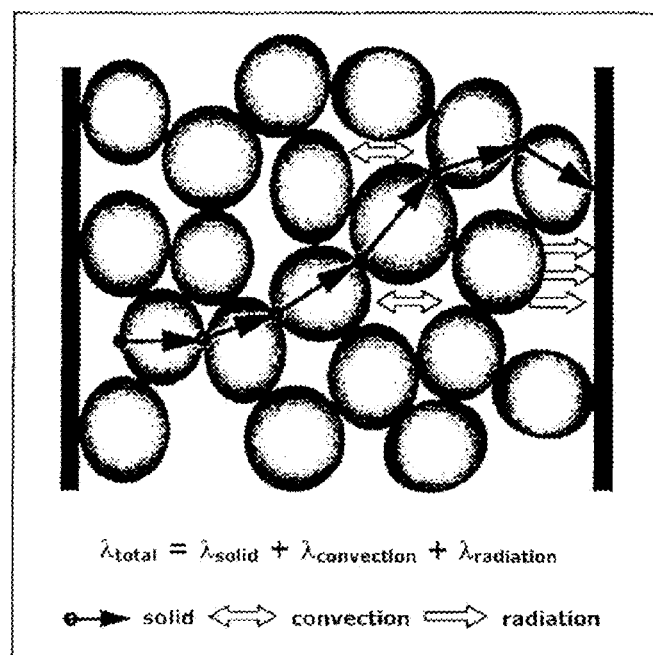
FIG. 1: Schematic representation of the individual contributions to the thermal conductivity of a porous solid (Porextherm, www.porextherm.com).
Figure 2:
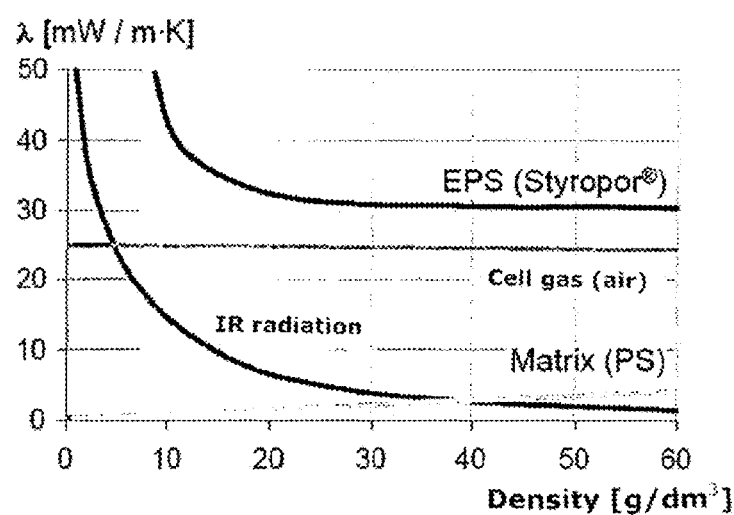
FIG. 2: Plot of the material density versus the thermal conductivity for the different contributions to the overall thermal conductivity of Styropor® (Kessenich, E., Smart Energy Home (2007), BASF Future Business GmbH, Ludwigshafen, Germany).

In the process according to aspect (1) of the invention, the porous (starting) material is selected from thermoplastic materials, glass-forming substances, such as glass, metals and other amorphous-solidifying substances, and mixtures thereof.

According to the preferred aspect (2) of the invention, the (starting) material is a thermoplastic polymer, preferably a polystyrene including polystyrene or a polystyrene substituted at the benzene ring or at the vinylic double bond, a poly(meth)acrylate, such as polymethyl, polyethyl and polypropyl(meth)acrylates, polystyrene and polymethyl methacrylates being particularly preferred.

The solubility of the blowing agent in the matrix is not critical and need not be considered. The process according to the invention stands out against all other mixing methods and foaming methods, which dissolve the blowing agent in the matrix and require a lot of time for this, while the soaking of the sphere dispersion is effected directly in the present invention.

A "compact packing in which the individual particles contact one another" according to the invention is a packing in which the particles account for a volume fraction of more than 0.5 (i.e., the porosity is smaller than 0.5), and also includes colloidal crystals or amorphous arrangements. In a special case of the close packing of monodisperse spheres in a face-centered cubic crystalline arrangement, for example, the volume fraction is 0.74, and the porosity is only 0.26. The invention is not limited to monodisperse spheres or to only crystalline arrangements, because the phenomenon underlying the invention is of fundamental importance. The thermoplastic polymer may preferably be prepared by emulsion polymerization, so that the close packing of spheres has particle radii between 20 and 500 nm.

In another preferred embodiment, the material is an amorphous-solidifying material, a process using sugar spheres as a starting material being particularly preferred.

According to the invention, (i) said surpassing of and falling below the glass transition temperature ($T_g$) of the (thermoplastic) material can be effected by heating or cooling, or (ii) said surpassing of the glass transition temperature ($T_g$) of the (thermoplastic) material can be caused partially or completely by reducing the $T_g$ when the supercritical gas is added, and the falling below the glass transition temperature ($T_g$) of the (thermoplastic) material can be caused partially or completely by said releasing to atmospheric pressure.

Said supercritical gas may be a gas or mixture of gases leading to a reduction of the glass transition temperature of the thermoplastic material when added thereto, and preferably the gas is selected from $N_2$, $CO_2$ and any other supercritical gases, and may also be a mixture thereof.

The supercritical gas may be added at a pressure starting from the critical pressure $p_c$ to 300 bar, preferably from $p_c$ to 100 bar, and at a temperature of from the critical temperature $T_c$ to 300° C., preferably from $T_c$ to 200° C.

In the produced thermoplastic material with homogeneous gas-containing inclusions, the gas-containing inclusions have a mean size of below 1 μm, preferably below 0.5 μm. The volume fraction of the gas-containing inclusions in the total volume of the (thermoplastic) material is from 0.1 to 90%.

In a particularly preferred embodiment of aspect (2), the thermoplastic material is a polystyrene, especially polystyrene, and said supercritical gas is $CO_2$ or a mixture thereof with $N_2$, and in step (b) said supercritical gas has a pressure of from the critical pressure $p_c$ to 300 bar, preferably from 10 to 200 bar.

In a particularly preferred embodiment of aspect (2), the thermoplastic material is a polymethacrylate, especially poly(methyl methacrylate), and said supercritical gas is $CO_2$ or a mixture thereof with $N_2$, and in step (b) said supercritical gas has a pressure of from the critical pressure $p_c$ to 300 bar, preferably from 10 to 200 bar.

Figure 3:
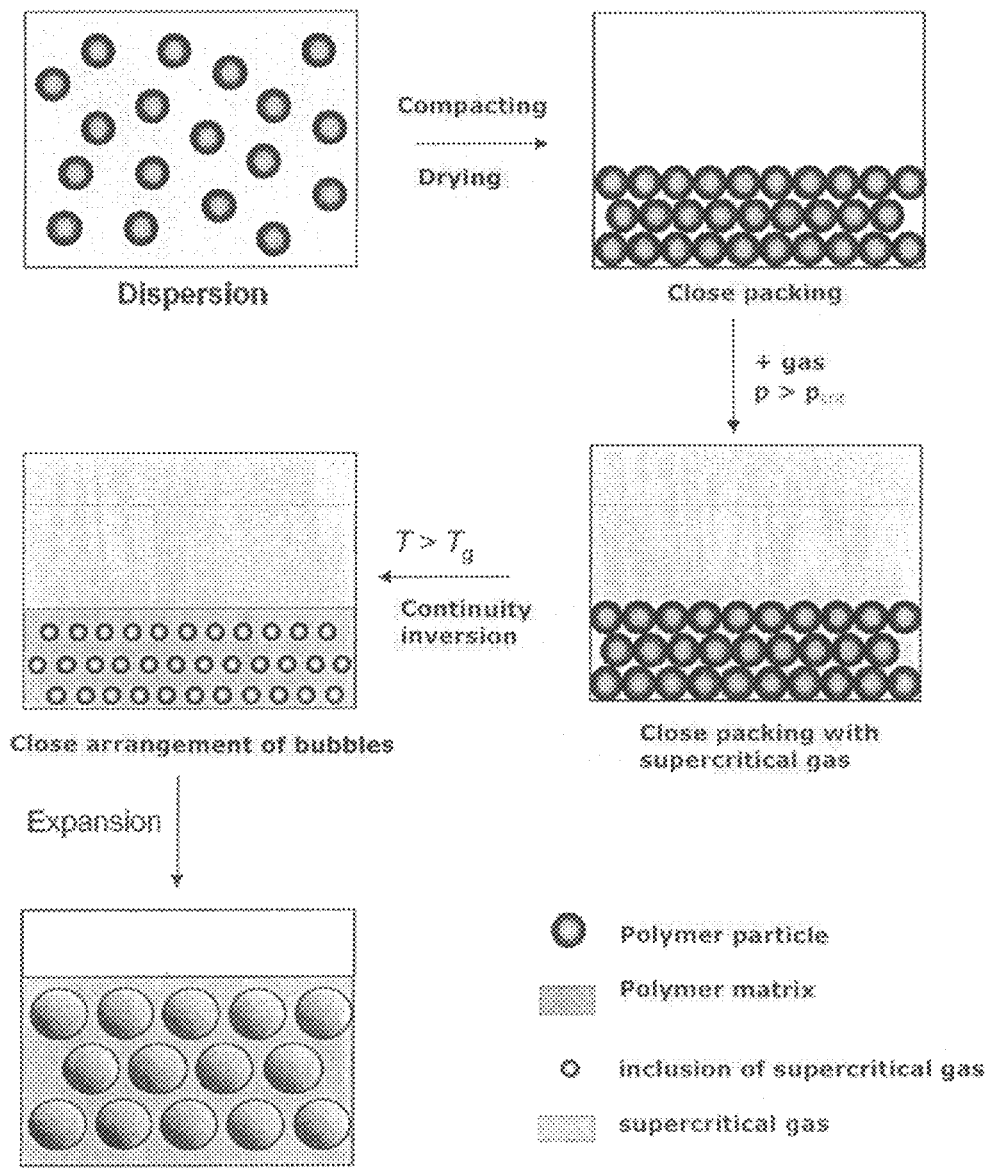
FIG. 3: Scheme of the principle for generating nanodisperse inclusions in a high-viscosity matrix. After conversion to a colloidal crystal, a supercritical gas is added. Subsequently, the $T_g$ of the polymer is surpassed, so that a phase inversion occurs, i.e., the supercritical gas is now dispersed in the polymer matrix. In the last step, the sample is released to atmospheric pressure.

The approach for generating nanodisperse inclusions in a high viscosity matrix as employed herein is schematically shown in FIG. 3. The starting point of the principle for generating nanodisperse inclusions in a high viscosity matrix is close packings of nanoparticles. These are readily available, because they can be produced by drying nanoparticle dispersions produced by emulsion polymerization (Norris, D. J. et al., Advanced Materials 16: 1393-1399 (2004)). The drying is possible in different ways:

centrifuging followed by pipetting off the solvent;
filtering off through a nanostructured membrane filter;
evaporation of the solvent.

The nanoparticle packing prepared in one of these ways is subsequently placed into the atmosphere of a gas to be compressed later, or of a gas already compressed. Subsequently, the pressure and temperature in the sample compartment are set to such values that the gas is in a supercritical state.

In this invention, both carbon dioxide and nitrogen were used as supercritical gases. The critical parameters of these gases are shown in Table 1.

TABLE 1

Critical values for nitrogen and carbon dioxide (Boyer, S. A. E. and Grolier, J. P. E., Pure and Applied Chemistry 3: 593-603 (2005)).

| Fluid | $p_c$/MPa | $T_c$/K |
|---|---|---|
| $N_2$ | 3.398 | 126.19 |
| $CO_2$ | 7.375 | 304.13 |

Of many polymers it is known that near-critical fluids cause a lowering, in part drastic, of their glass transition temperature. In this way, it is possible by selecting suitable parameters to convert the polymer to a deformable state below its original glass transition temperature. In this state, the spherical structure is no longer stable because of its extremely high surface, and coalesces into a homogeneous high-viscosity matrix. Because of the surface tension, the hollow spaces of the packing filled with supercritical gas (also referred to as inverse plateau borders) possess a thermodynamic driving force to minimize their surface, so that gas bubbles form in a high viscosity polymer matrix. Thus, this process can be referred to as a phase or continuity inversion from polymer particles in a supercritical gas to supercritical gas bubbles in a polymer matrix.

Continuity inversion is the characteristic feature of this invention: At first, the gas phase is continuous (i.e., coherent), and the polymer particles are discrete (individual), and after continuity inversion, the polymer phase is continuous, and the gas bubbles are secluded (discrete).

The diameter of the gas bubbles produced in this way results from the size dimension of the hollow spaces in the packing. When nanometer-sized particles are used, the hollow spaces in the packing structure and thus also the bubbles formed therefrom are also on a nanometer scale.

After the gas inclusions have been formed, the material/polymer can be fixed in either of two different ways. On the one hand, the pressure of the system can be reduced quickly or slowly, which results in an (adiabatic or isothermal, respectively) expansion of the supercritical gas. The volume increase of the gas has a steady course without a nucleation step occurring, because the gas is in a supercritical state. In addition, the expansion of the gas causes the glass transition temperature of the polymer/material to rise abruptly, whereby a fixation of the system in the form of a (nanoporous) foam is possible. Further, the system may also be fixed into a nanostructured polymer/material by controlled expansion (with simultaneous cooling of the system). The lowering of the glass transition temperature of the polymer is determined by interactions between the gas and polymer and highly depends on the nature of the gas employed, this phenomenon being particularly pronounced when $CO_2$ is used (Shieh, Y. T. and Liu, K. H., Journal of Polymer Research-Taiwan 2: 107-113 (2002)).

However, in the above described production of gas inclusions in a (polymer) matrix, the solubility of the gas in the material/polymer, which is temperature- and pressure-dependent, must be additionally considered. A lowering of the pressure usually results in a lower solubility of the gas in the material/polymer. Thus, when a mixture of gas and material/polymer expands, the two components will segregate, which results in the formation of further porous structures.

As compared to the principle of supercritical microemulsion expansion (briefly POSME method), which was developed by Strey, Sottmann and Schwan also for producing nanoporous materials starting from supercritical fixable Microemulsions, this approach has the advantage that no surfactant is necessary (Schwan, M., Doctoral Thesis (2006), Cuvillier Verlag, Göttingen, Germany). In addition, the dependence, in part high, of the phase behavior of the microemulsion on the pressure, temperature and composition during the fixation and expansion of the system must be considered in the POSME method. Thus, a drastic increase of the surface tension between the water and supercritical fluid occurs during the expansion of the system, which usually results in a segregation of the system. This in turn leads to a considerable coarsening of the resulting foam structure. Such effects need not be considered in the process underlying this invention, whereby an uncomplicated production of nanoporous materials is possible.

As compared to the process used for aerogel production, the process according to the invention has the advantage that the step of drying the gel by means of a supercritical fluid, which is cost-intensive and requires a high expenditure, is omitted.

An approach that is comparable on first sight was filed for patent application in 1984. However, very long times of exposure of the polymer to the gas were chosen in this process, because the sample should be foamed by the gas dissolved in the polymer (Martini-Wedensky, J. E., U.S. Pat. No. 4,473,665 (1984)).

Accordingly, another property characterizing the present invention is the fact that the blowing agent is not required to saturate the polymer, dissolving therein on a molecular level, but that the blowing agent trickles into the packing gaps like a liquid. This characteristically results in extremely short times of contact of the supercritical fluid with the polymer.

Figure 4:
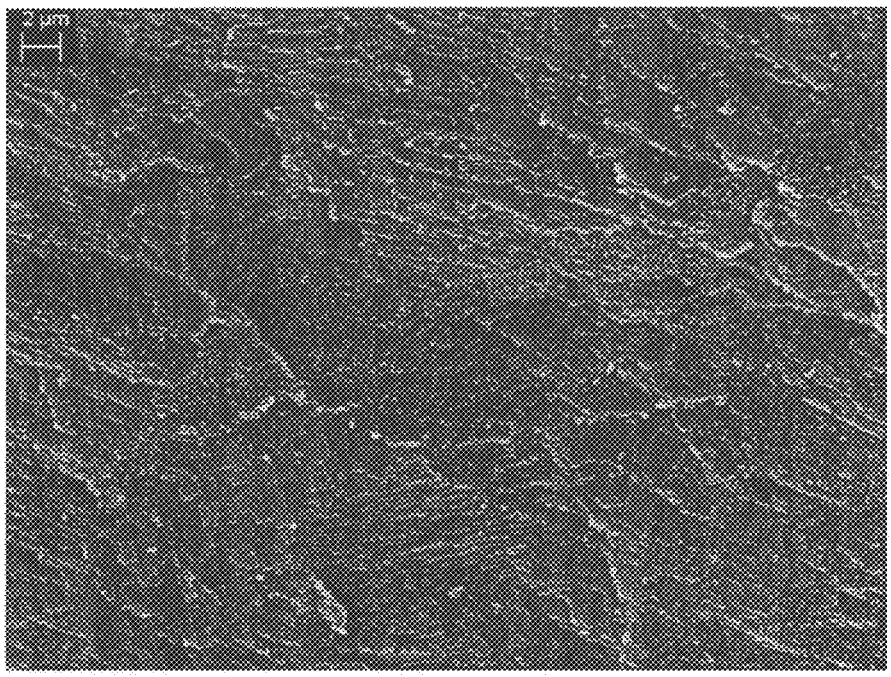
FIG. 4: Scanning electron micrograph of a breaking edge of the starting material for foaming experiments (2000 times magnification). It can be clearly seen that the individual particles are arranged to a close-packed colloidal crystal. The PMMA particles have a diameter of about 300 nm.
Figure 5:
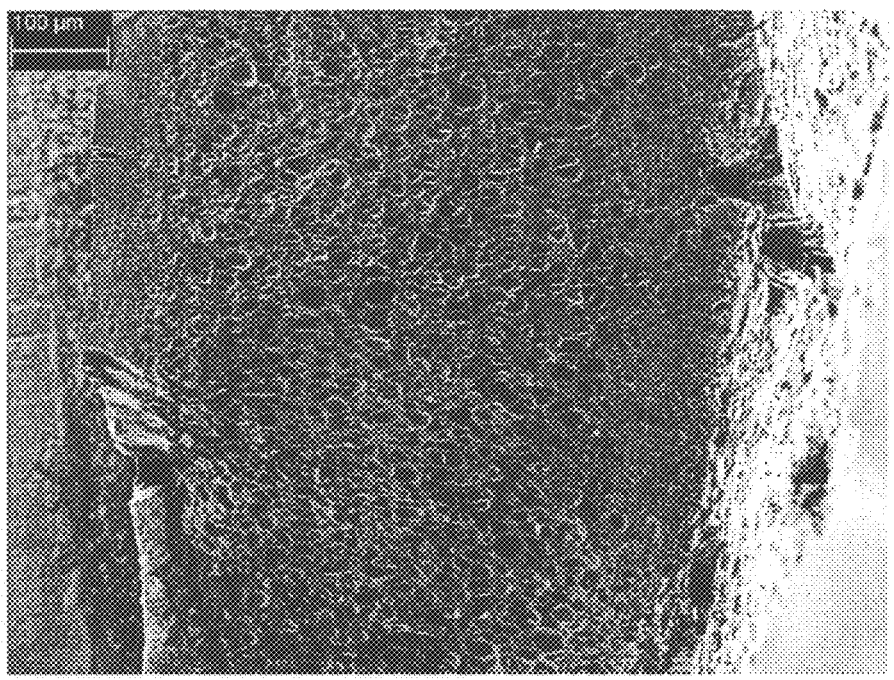
FIG. 5: Scanning electron micrograph of the breaking edge of a PMMA crystal foamed at 50° C. and 200 bar ($CO_2$) (100 times magnification). The sample was exposed to the above conditions for 10 min before expansion was started. The morphology of the foam in the middle differs in structure size from that on the edge, the pore size in the middle being on the order of 20 μm. The surface of the foam is almost smooth.
Figure 6:
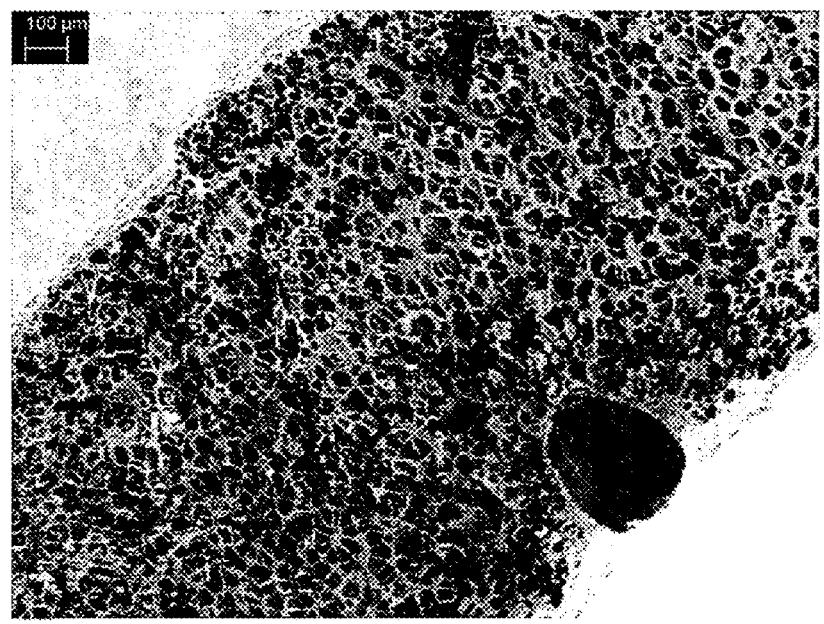
FIG. 6: Scanning electron micrograph of the breaking edge of a PMMA crystal foamed at 50° C. and 200 bar ($CO_2$) (50 times magnification). The sample was exposed only briefly to the above conditions before expansion was started. Beforehand, the sample was exposed to a $CO_2$ atmosphere for one hour. The structure size is again about 20 μm, a clearly more homogeneous foaming having occurred.
Figure 9:
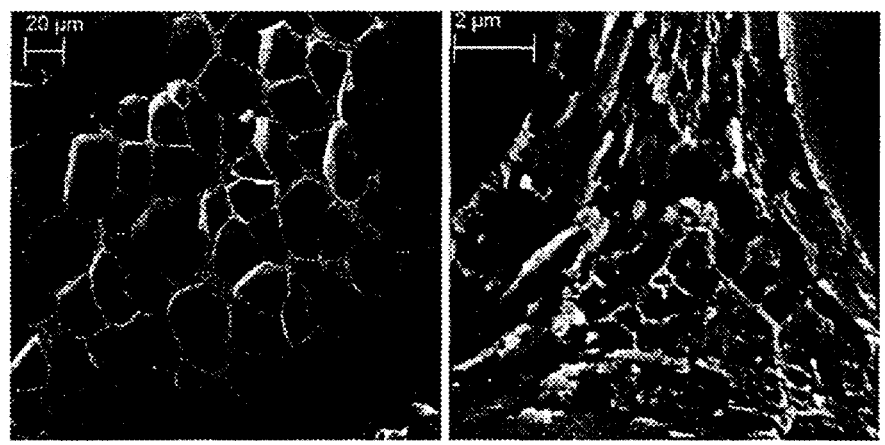
FIG. 9: Scanning electron micrographs of the breaking edge of a PMMA crystal foamed at 20° C. and 75 bar ($CO_2$) (200 and 4000 times magnification). The sample was exposed to the above conditions for 10 min before expansion was started. Left panel: The structure on the order of 20 μm as already known from previous micrographs. Right panel: More detailed view of the plateau border (enlarged view of the red marked section). It is evident that there is a substructure that is also foam-like, but on a significantly smaller scale.
Figure 10:
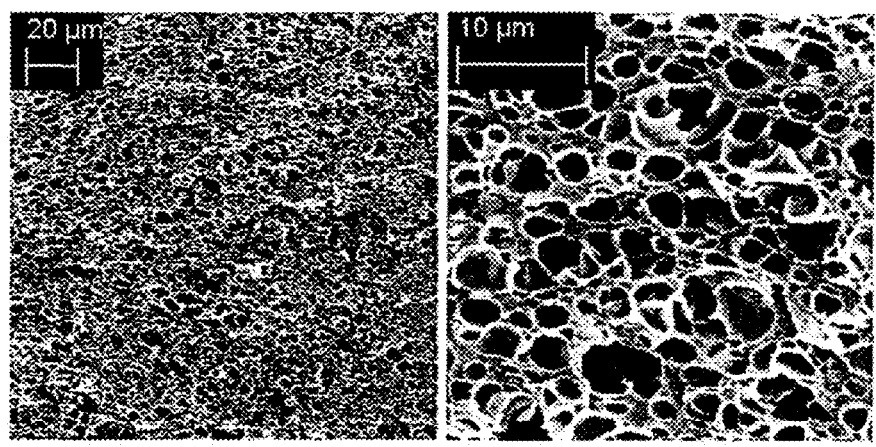
FIG. 10: Scanning electron micrographs of the breaking edge of a thin layer of PMMA nanoparticles foamed at 50° C. and 200 bar (200 and 1000 times magnification). The sample was exposed to the above conditions for 10 min before expansion was started. The pore size is between 0.5 and 5 μm.
Figure 11:
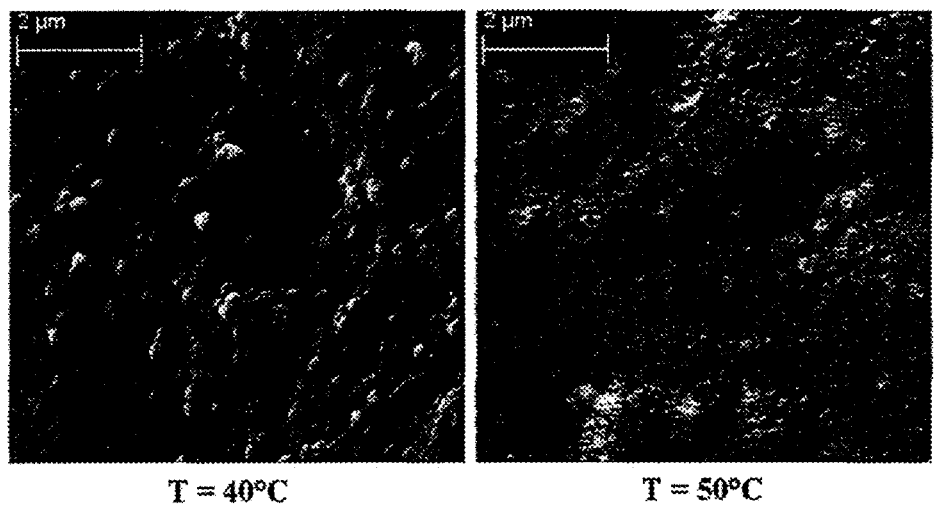
FIG. 11: Scanning electron micrographs of the surface of foamed thin layers consisting of PMMA nanoparticles (5000 times magnification). The samples were exposed to the respective temperatures at a $CO_2$ pressure of 200 bar for 10 min before expansion was started. Left panel: The nanoparticles employed have in part been retained on the surface. Further, pores on the order of between 50 and 200 nm have formed, which were caused by the gas inclusions between the particles. Right panel: At a higher temperature, an increased coalescence of the nanoparticles occurs, the underlying structure still being recognizable. Depressions in the nanometer range have also formed.
Figure 12:
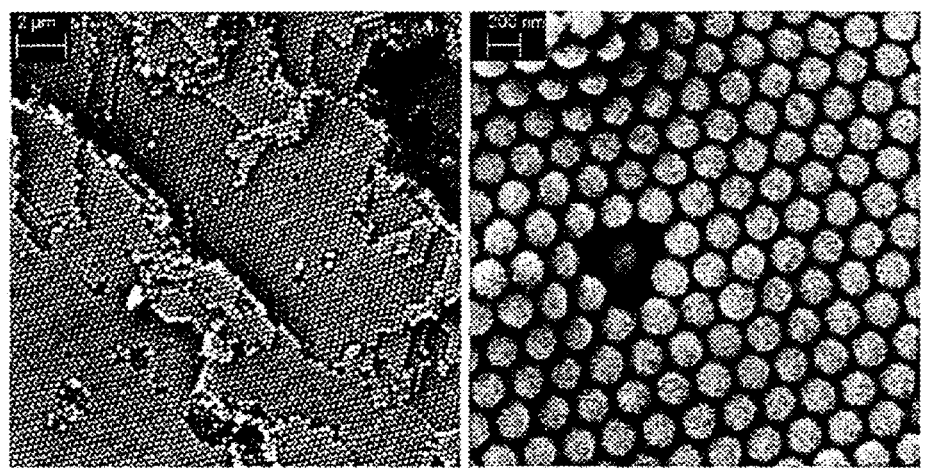
FIG. 12: Scanning electron micrographs of the breaking edge of a foaming experiment at 99° C. and 300 bar of $N_2$ pressure (3000 and 20,000 times magnification). The sample was exposed to the above conditions for 10 min before expansion was started. The sphere packing of the PMMA nanoparticles has been retained.
Figure 13:
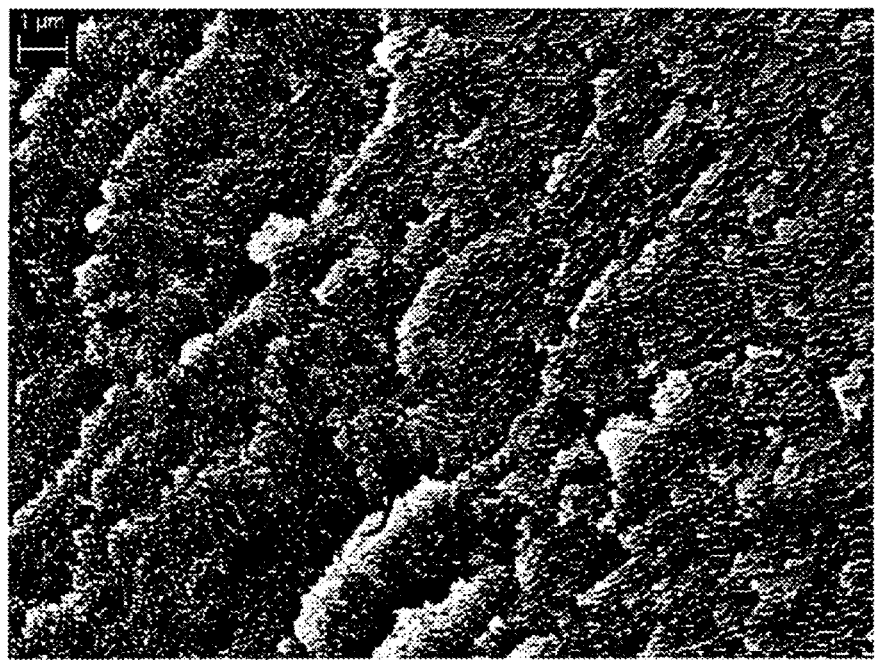
FIG. 13: Scanning electron micrograph of a breaking edge of the starting material for foaming experiments (5000 times magnification). It can be clearly seen that the individual particles are arranged to a close packed colloidal crystal. The PS particles have a diameter of about 80 nm.

The desired colloidal crystals could be subsequently obtained by drying the nanoparticles produced (FIGS. 4 and 13). These were used as starting materials for realizing the principle of generating nanodisperse inclusions in a high viscosity matrix in which both $CO_2$ and $N_2$ were employed as supercritical gases. A very pronounced reduction of the glass transition temperature could be observed in the system PMMA/CO$_2$ because of the strong interaction between the polymer and blowing agent, so that the polymer was converted to a deformable state already at room temperature under a CO$_2$ atmosphere. For this reason, foaming could be controlled only with difficulty, and foams resulted whose pores were inhomogeneously distributed and had a size of about 20 µm (FIG. 5). Although the size distribution of the foam pores could be reduced by longer times of exposure of the PMMA crystal to the blowing agent, a pore size of about 20 µm remained (FIG. 6). However, a transfer of the original nanostructure of the colloidal crystal was possible to some extent below 20° C. In this case, a substructure also having a foam-like structure, but with a pore size of below 1 µm, formed on the foam web material (FIG. 9). If thin layers of PMMA nanoparticles were used as a starting material, foams having a pore size between 0.5 and 5 µm were formed (FIG. 10). It is believed that the lower sample thickness causes the gas to exit more quickly, which results in smaller foam pores. In addition, a nanostructuring of the surface of the foam could be observed, from which it could be seen that the principle on which this work is based could be implemented in practice (FIG. 11). When N$_2$ was used as a blowing agent instead of CO$_2$, the production of a PMMA foam was not possible because the glass transition temperature of the polymer was not sufficiently lowered by N$_2$ (FIG. 12).

Figure 14:
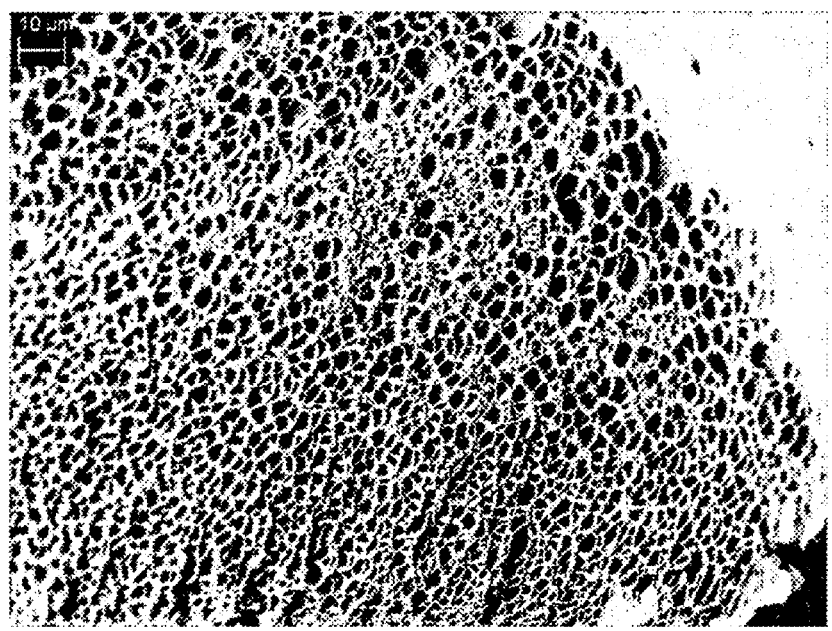
FIG. 14: Scanning electron micrograph of the breaking edge of a PS crystal foamed at 60° C. and 200 bar ($CO_2$) (500 times magnification). The sample was exposed to the above conditions for 10 min before expansion was started. A foam with a pore size of between 1 and 5 μm has formed within the sample, and the surface of the sample is almost smooth.
Figure 15:
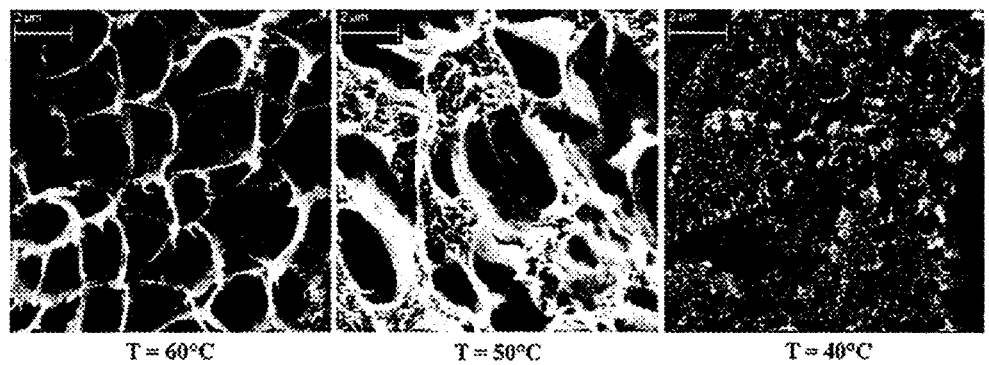
FIG. 15: Scanning electron micrographs of the breaking edges of foamed PS crystals (5000 times magnification). The samples were exposed to the respective temperatures at a $CO_2$ pressure of 200 bar for 10 min before expansion was started. With decreasing temperature, the pore size decreases, but the material density increases considerably.
Figure 19:
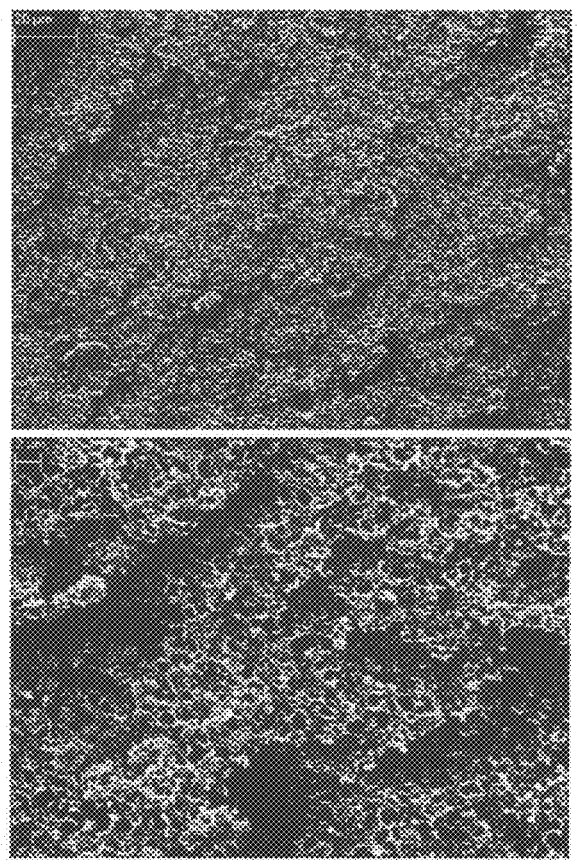
FIG. 19: Scanning electron micrograph of the breaking edge of a PS crystal foamed at 99° C. and 300 bar ($N_2$) (500 and 2000 times magnification). The sample was exposed to the above conditions for 10 min before expansion was started. As can be seen on the two panels, a foam has formed that, while it has a rather high material density, is characterized by a small pore size of up to 1 μm.
Figure 20:
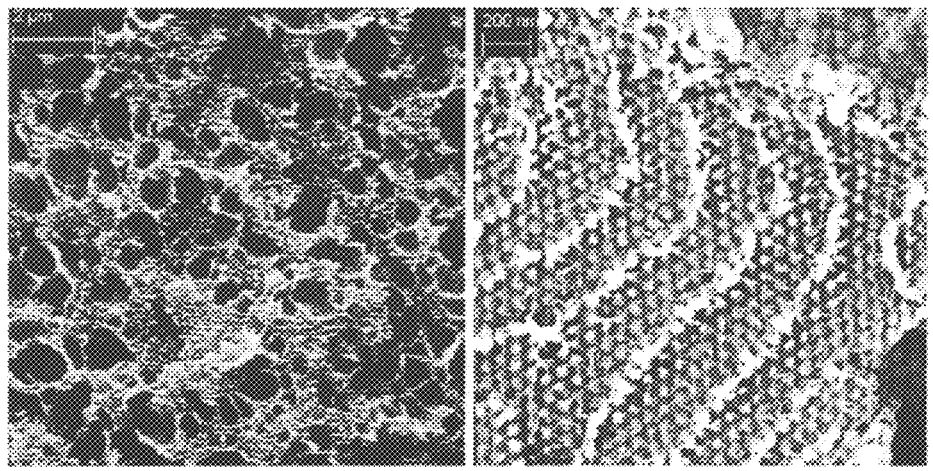
FIG. 20: Scanning electron micrograph of the breaking edge of a PS crystal foamed at 99° C. and 300 bar ($N_2$) (5000 and 30,000 times magnification). The sample was exposed to the above conditions for 10 min before expansion was started. At such magnifications, it becomes evident that a substructure in which both the particles and the type of packing are recognizable underlies the foam structure.

In the system PS/CO$_2$, differences, in part significant, as compared to the use of PMMA were observed, whose origin is mainly due to the weaker interaction between CO$_2$ and PS. Thus, PS was converted to a deformable state, which is required for the foaming process, only from 40° C. under a CO$_2$ atmosphere. Above 40° C., an increase of temperature caused both a reduction of the material density and a coarsening of the structure. However, the substructure, which originated from the particle structure of the starting material, grew constantly weaker when the temperature was increased. Finally, at 60° C., a substructure that consists of coalesced particles rather than of a foam in contrast to the PMMA foams could no longer be observed (FIGS. 14 and 15). In this work, the most promising results could be achieved with the system PS/N$_2$. It resulted in the formation of a homogeneous foam with a pore size of below 1 µm and an additional substructure in the nanometer range (FIGS. 19 and 20).

Another example of the possible implementation of the process according to the invention is seen in the use of sugar as a thermoplastic starting material. Small-pore sugar foams have a high application potential in the food industry because of their unique mouth feel and in view of the increasing importance of low calorie food.

Figure 23:
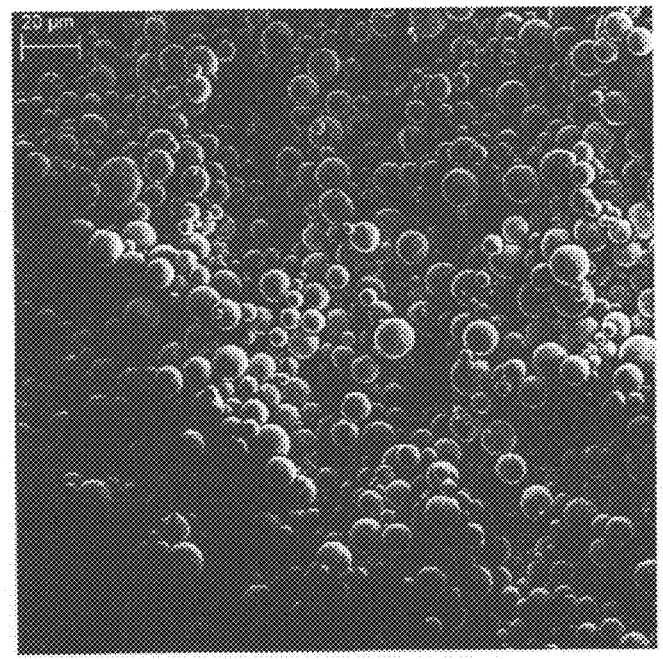
FIG. 23: Scanning electron micrograph of an amorphous arrangement of sugar particles with a diameter of from 1 to 20 μm. These serve as a starting material for preparing sugar foam according to the NF-CID method.
Figure 24:
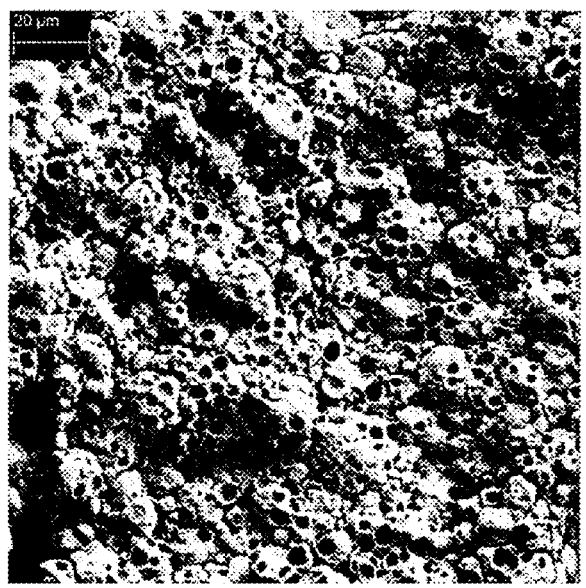
FIG. 24: Scanning electron micrograph of a sugar foam prepared by the NF-CID method and having a pore size of between 1 and 5 μm. Starting from an amorphous packing of sugar particles, foaming was performed at 60° C. and 250 bar with $CO_2$ as the foaming agent, the sample being exposed to such conditions for 60 s.
Figure 25:
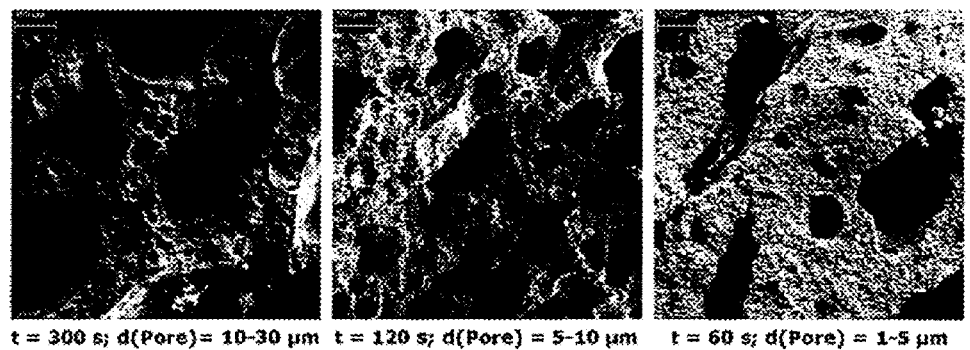
FIG. 25: Scanning electron micrographs of sugar foams prepared by the NF-CID method. Starting from an amorphous packing of sugar particles, foaming was performed at 60° C. and 250 bar with $CO_2$ as the foaming agent. The resulting pore size in the web material ($d_{pore}$) of the respective foams becomes significantly smaller as the heating time (t) decreases.

Starting from an amorphous packing of sugar particles (FIG. 23), sugar foams in the lower micrometer range could be produced (FIG. 24). It is to be pointed out that the blowing agent (CO$_2$) dissolves in the sugar matrix only in very small amounts (G. Ferrentino et al., Ind. Eng. Chem. Res. 49: 2992-3000 (2010)), and that thus the blowing agent dissolved in a "monomer" way cannot be responsible for the foaming process. Rather, the porous structure is obtained from the CO$_2$ entrapped in the packing gaps, wherein layer thicknesses of >10 mm were used. This represents a clear delimitation to previously known foaming processes, in which long exposure times to the blowing agent of the matrix to be foamed or only very thin layers (<1 mm) are used (B. Krause, Polymer Nanofoams, 2001; Enschede, N L; Y. Handa and Z. Zhang, J. Polym. Sci. B: Polym. Phys. 38: 716-725 (2000); S. K. Goel and E. J. Beckman, Polymer Engineering and Science 34: 1137-1147 and 1148-1156 (1994)). In addition, it could be found that the pore size could be minimized the more, the shorter the chosen heating time was (FIG. 25). By means of this application example, it could be shown that it is possible to convert a material in particle form (amorphous-solidifying material) to a micropore or nanopore foam by means of the process according to the invention without having to consider the solubility of the blowing agent in the matrix consisting of the (amorphous-solidifying) material.

EXAMPLES

Abbreviations and Symbols

General p: pressure; $p_{crit}/p_c$: critical pressure; t: time; T: temperature; $T_c$: critical temperature; $T_g$: glass transition temperature; $T_m$: melting temperature.

Polymers and Chemical Substances

KPS: potassium peroxodisulfate; PEMA: poly(ethyl methacrylate); PMMA: poly(methyl methacrylate); PS: polystyrene.

Example 1

Foaming Experiments with PMMA

CO$_2$ as the Blowing Agent:

In the experiments of foaming PMMA with CO$_2$, the colloidal polymer crystals were used as the starting material. FIG. 4 shows the starting material prior to foaming. When the solvent is removed, the particles arrange themselves in layers of close packings, the individual layers exhibiting a hexagonal pattern of the spheres. Further, it can be seen that the proportion of disorder, which results in a reduction of packing density, is very low. As a result, it can be assumed that the percentage of space filled in the crystal is close to the ideal value of 74%. Thus, about one quarter of the volume is available for the gas being supplied later.

FIG. 5 shows the result of a foaming experiment with a colloidal PMMA crystal (FIG. 4) after it had been exposed to a temperature of 50° C. and a CO$_2$ pressure of 200 bar for 10 minutes. In the middle of the sample, a foam having a pore size on the order of 20 µm has formed. However, towards the outside, the foam becomes increasingly more small-pore up to an almost smooth surface. The differences in morphology within the sample can be explained as follows: Presumably, a homogeneous distribution of the CO$_2$ was not achieved within the 10 minutes, and thus the foaming process took place in a non-uniform way. At the surface, the surface tension should be responsible for the formation of a smooth surface because of the heavy contact with CO$_2$.

In order to check the extent to which the diffusion of the gas through the polymer matrix has an influence on the formed foam, in another experiment, the sample was left under a CO$_2$ atmosphere for 1 hour before it was heated at 50° C. for 10 minutes. The foam formed thereby is shown in FIG. 6. From FIG. 6, it can be seen that a longer time of exposure to the CO$_2$ gas before the heating has a positive effect on the homogeneity of the foam, this means that it takes up to one hour before the diffusion of the gas through the polymer matrix is complete. Although the foam shown above is more homogeneous than that shown in FIG. 5, its structure is still clearly above the sought pore size. Since the pore size is far above the structure size of the colloidal crystal and since no indications of the original structure can be found even upon a closer view, it stands to reason that the foam structure was formed independently of the structure of the crystal. This would mean that a complete coalescence of the particles occurs before the expansion. In order to increase the probability of obtaining the original nanostructure, further experiments were performed at less elevated temperatures and without an exposure time. For the supercritical state of the gas to be ensured, the lower temperature limit was set to 35° C. at first.

Figure 7:
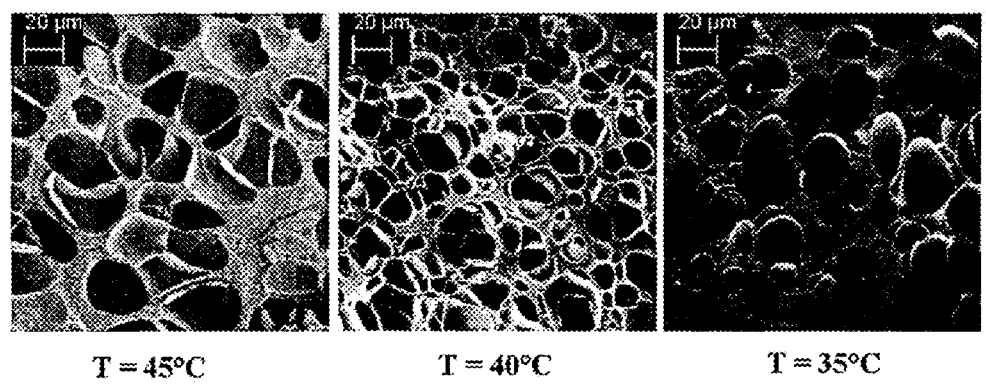
FIG. 7: Scanning electron micrographs of the breaking edges of foamed PMMA crystals (200 times magnification). The samples were exposed to the respective temperatures at a $CO_2$ pressure of 200 bar for 10 min before expansion was started. All foams exhibit a similar mean structure size of about 20 μm.

All foaming experiments were again performed at a pressure of 200 bar. The results are summarized in FIG. 7. Although the foams shown in FIG. 7 are slightly different in structure, the pore size remains within a range of from 10 to 30 μm. In addition, it becomes clear that lowering the foaming temperature results in the formation of channels by the matrix rather than in a closed-cell foam. Consequently, neither could the nanostructure of the colloidal crystal be transferred, nor the foaming process improved, by lowering the temperature.

Figure 8:
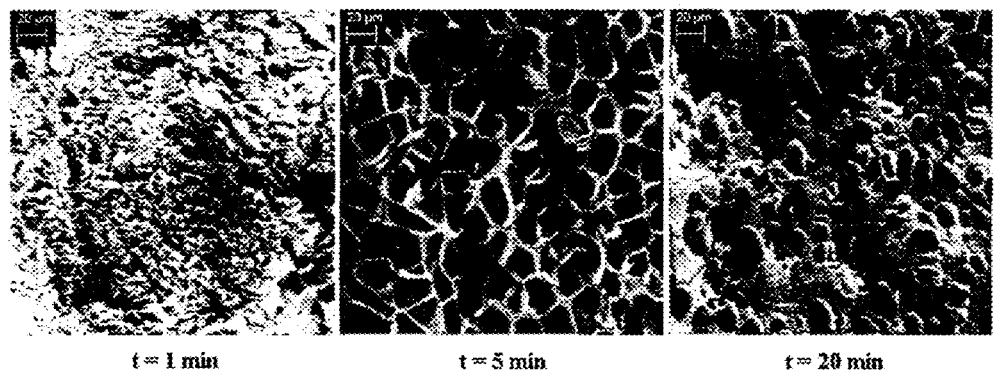
FIG. 8: Scanning electron micrographs of the breaking edges of foamed PMMA crystals (250 times magnification). The samples were exposed to 40° C. at a $CO_2$ pressure of 200 bar for the respective heating times before expansion was started. From the micrographs, it can be seen that formation of a closed-cell foam that is comparable to the previous foams occurs only with a heating time of 5 min. After 1 min, only a very slight foaming of the sample occurs. After 20 min, the sample has a high material density, which also speaks in favor of the assumption that only a slight foaming process took place.

In addition to temperature, the time of heating during which the colloid crystal is exposed to the selected conditions (pressure and temperature) could also have a crucial influence on the structure of the resulting foam. For this reason, further foaming experiments were performed after a heating time of 1, 5 and 20 minutes at a constant temperature of 40° C. and a pressure of 200 bar. The results of this series are shown in FIG. 8. The foams formed at the different heating times exhibit clear differences in quality. While the sample did hardly foam after 1 minute, the result after 5 minutes is comparable with the previous foams, which were exposed to the conditions for 10 minutes. Extension beyond this heating time, much like a reduction of the foaming temperature, results in the forming of channels and in a higher material density. However, a nanostructure of the foam derived from the structure of the nanoparticle crystal could be observed in none of the three experiments. Rather, the experiments performed to date yielded micrometer-sized foam bubbles embedded in a homogeneous polymer matrix independently of the foaming temperature, the heating time and the time of exposure to the gas. This suggests that the nanoparticle crystals are completely coalesced already at low temperatures and $CO_2$ pressures, whereby the nanostructure of the crystal gets lost. In order to confirm this assumption, another foaming experiment was performed at 20° C., 75 bar and for a heating time of 10 minutes. The thus produced foam is shown in FIG. 9.

The micrographs show that foaming of the sample occurs already at room temperature and under the filling pressure of the cell. On first sight, the foam structure is highly similar to that of other foams, a closer inspection revealing that a substructure that can be found in the plateau borders of the foam pores underlies the 20 μm foam. It also has a porous structure, but in the nanometer range. The origin of this structure could be the fact that, when the temperature is sufficiently low, the colloid crystal does not coalesce completely, so that the nanostructure of the crystal is not completely lost. This assumption would be in accordance with the observation that the size of the substructure is on the order of the nanostructure of the colloid crystal. In addition to the previously produced PMMA foams, thin PMMA foam layers are also of interest, which is why thin layers of PMMA particles were used as a starting material for the foaming experiments. The foaming experiments were performed at 50° C. and 200 bar, a heating time of 10 minutes being chosen. FIG. 10 shows the scanning electron micrographs of the interior of the foam produced in this way.

When thin layers of PMMA particles were used, a foam could be produced that is characterized by a smaller pore size as compared to the previously produced PMMA foams. However, the structure size is further too large to be derived from the starting structure. In contrast, if the surface of the foam prepared from the PMMA layer is examined, a clear nanostructure can be seen as compared to the surface of the previous foams, which always had a smooth appearance. FIG. 11 shows the surfaces of these samples. On the one hand, the nanoparticles of the colloidal crystal can be seen, and on the other hand, a large number of pores that are on the order of from 50 to 200 nm can be observed on the surface. Especially in the left panel, it becomes clear that these pores are presumably derived from gas inclusions between the closely packed polymer particles. When the two panels are compared to one another, it is seen that a higher extent of coalescence occurs at elevated temperatures, so that the particles can be seen only weakly under the surface. Further, the density of the indentations is higher in the right panel. However, at least for the larger pores, it may again be considered that they are formed from gas inclusions in the free spaces in the packing, so that the possible implementation of the principle underlying this work could be proven.

$N_2$ as the Blowing Agent:

As shown above, the handling of the system PMMA/$CO_2$ seems to be difficult, because already when the high-pressure cell is filled with $CO_2$ at room temperature, the glass transition temperature is lowered so much that the particles coalesce. From the references (Tung, K. L. et al., Desalination 1-3: 391-400 (2006), and de Sales, J. A. et al., Journal of Membrane Science 1-2: 129-140 (2008)), it could be seen that nitrogen also lowers the glass transition temperature of the polymer. However, this effect is significantly weaker than with $CO_2$ because of the inert behavior of $N_2$, and therefore, the performance of foaming experiments in the system PMMA/$N_2$ suggests itself. FIG. 12 shows the result of the foaming experiment with this system at 99° C. and 300 bar. It also employed the previously used starting material. It can be clearly seen that no coalescence of the particles occurred, and the structure is identical with that of the starting material. Thus, a significant reduction of the glass transition temperature seems not to have taken place, all the less so since PMMA has a glass transition temperature of 104° C. under atmospheric conditions. However, since the polymer is to be fixed during the expansion without changing the temperature, a foaming temperature above 100° C. is not reasonable. In this case, the foaming temperature would be too close to the glass transition temperature of the polymer under atmospheric pressure, so that a fixed condition immediately after the expansion would not be ensured.

Example 2

Foaming Experiments with PMMA $CO_2$ as the Blowing Agent:

In the foaming experiments with PMMA, a considerable lowering of the glass transition temperature occurred at all temperatures above 20° C. because of the pronounced interaction between $CO_2$ and PMMA, so that the nanostructure of the crystal could not be transferred to the foam. For this reason, further experimental series were performed with the system PS/$CO_2$, because a less pronounced reduction of the glass transition temperature of the polymer by the $CO_2$ should occur in this case (Shieh, Y. T. and Liu, K. H., Journal of Polymer Research-Taiwan 2: 107-113 (2002)). The colloidal polystyrene crystals obtained from emulsion polymerization were used as the starting material. A scanning electron micrograph of these crystals is shown in FIG. 13. In a way equivalent to that of the PMMA crystals, the PS particles became arranged in a close lacking, the particles having a diameter of about 80 nm. Here too, it is to be noted that the extremely high number of spherical particles leads to defects in the packing of spheres, which propagate through the crystal.

FIG. 14 shows the result of a foaming experiment performed at 60° C. and 200 bar. The colloidal crystal was exposed to the conditions for 10 minutes before expansion was started. In the foaming experiment with a PS crystal, a foam having a pore size of from 1 to 5 µm was obtained that has an almost uniform pore size distribution, in contrast to the results of the foaming experiments with PMMA. By analogy with the results from Example 1, the surface has a smooth appearance, which is in turn accounted for by the surface tension. Because of the strong contact between the blowing agent and the polymer, the thermodynamic driving force to form an interface with a minimum surface is predominant. However, the structure size of the foam is still too large to be directly derived from the structure of the polymer crystal. However, whether there is a relationship between the two structures, or a complete coalescence to form a homogeneous matrix occurred first, is to be clarified in further experiments.

In order to answer this question, the foaming temperature was gradually reduced, by analogy with the experiments performed with PMMA. Thus, foaming experiments were performed within a range of from 60-40° C., wherein a $CO_2$ pressure of 200 bar was always used. The results are summarized in FIG. 15.

Figure 16:
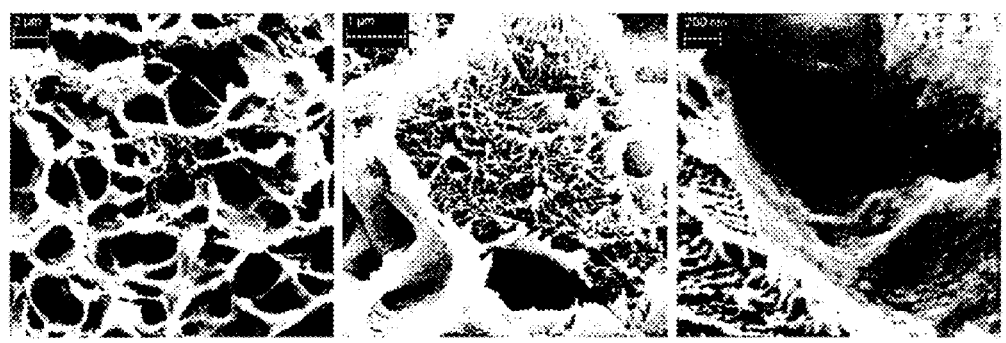
FIG. 16: Scanning electron micrograph of the breaking edge of a PS crystal foamed at 50° C. and 200 bar ($CO_2$) for a heating time of 10 min (3000, 10,000 and 30,000 times magnification). The middle panel shows residues of the coalesced nanoparticles, whereas the right panel shows that the presumably smooth surface of the material also exhibits nanostructures.

When this temperature series is contemplated, two facts become clear, above all. On the one hand, the pore size is constantly reduced when the temperature is lowered, while the material density in the foam keeps increasing on the other hand. Further, it can be observed that a more and more pronounced substructure of the web material or the foam matrix is observed as the temperature is reduced. This is shown in an exemplary manner in FIG. 16 for the foam produced at 50° C.

When the web material is examined more closely, it becomes clear that a substructure exists in which the PS particles can be recognized. However, a distinction has to be made between two different substructures. On the one hand, the particles coalesced to form small webs are recognized in FIG. 16 (middle). Because of the elongate shape of these webs, it can be assumed that these have been distorted by the generation of the breaking edge and that thus the interior of the web material is seen. On the other hand, a spherical structure can be recognized under a continuous layer in FIG. 16 (right). Conversely, it can be considered that this is a site that has not been damaged by the breaking, but an indentation that has remained unchanged by the sample preparation. Thus, a substructure on a nanometer scale underlies the foam.

Figure 17:
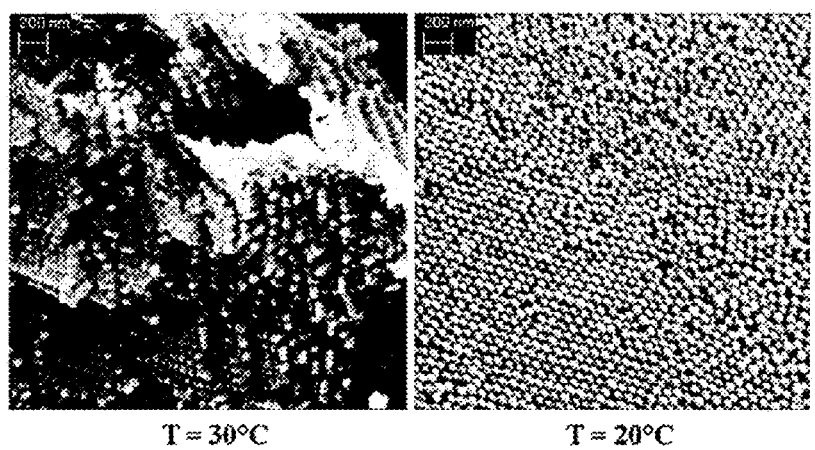
FIG. 17: Scanning electron micrographs of the breaking edges of foamed PS crystals (20,000 times magnification). The samples were exposed to the respective temperatures at a $CO_2$ pressure of 200 bar for 10 min before expansion was started. The particle structure was retained in both cases even after expansion. This allows the conclusion that the glass transition temperature of polystyrene was not decreased enough by the $CO_2$, so that it was exceeded. Some degree of particle coalescence can be seen only in the left panel, but there was no foaming of the sample.

If the foaming temperature is lowered to 30 or 20° C., a sufficient surpassing of the glass transition temperature of the polymer no longer occurs in the foaming experiments, as can be seen in FIG. 17. Consequently, the original structure of the colloidal crystal can still be recognized after the foaming process in both cases. At a foaming temperature of 30° C., a slight coalescence of the particles can be seen, whereas no structural changes occurred at 20° C. This allows to conclude that the glass transition temperature of polystyrene is from 30 to 40° C. at a $CO_2$ pressure of 200 bar, wherein the state of matter of the gas could also play a role.

Figure 18:
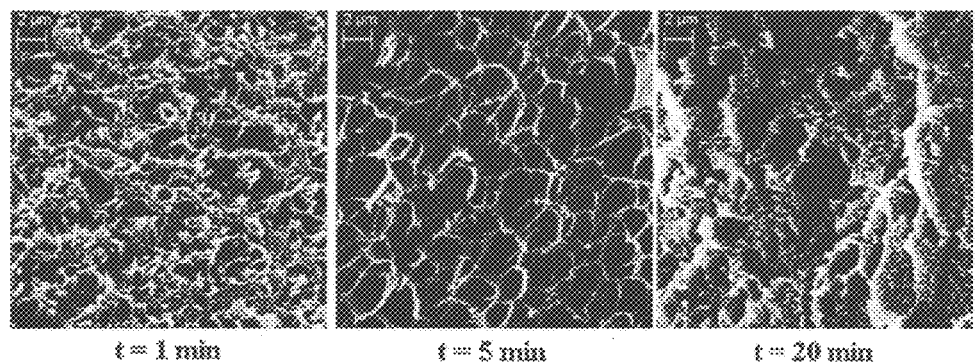
FIG. 18: Scanning electron micrographs of the breaking edges of foamed PS crystals (2000 times magnification). The samples were exposed at 50° C. and a $CO_2$ pressure of 200 bar for the respective heating times before expansion was started. From the micrographs, it can be seen that a foam comparable with the previous foams was formed only with a heating time of 5 min. While only a very slight foaming of the sample occurred after 1 minute, the sample has a high material density after 20 min, which also speaks in favor of the fact that a merely slight foaming process occurred.

In order to obtain further information on the system PS/$CO_2$, the time during which the polymer is exposed to the conditions was varied in another experimental series. FIG. 18 shows the results of this examination, which was again performed at a $CO_2$ pressure of 200 bar and a temperature of 50° C.

The PS foams obtained show clear differences upon a variation of the heating time. Although a small-pore foam has formed after 1 minute, the material density is very high as compared with the foam formed after 5 minutes, which is highly similar to the foams previously prepared in a heating time of 10 minutes. As can be seen from FIG. 18 (right), a further increase of the heating time has the effect that hardly any foam formation occurs. In this case, merely individual pores could be observed in an otherwise homogeneous polymer matrix.

$N_2$ as the Blowing Agent:

In addition to $CO_2$, the behavior of $N_2$ as a blowing agent in the foaming of the colloidal PS crystals was also to be examined. However, since $N_2$ has a clearly weaker influence on the glass transition temperature of the polymer, it is necessary to increase the foaming temperature. Therefore, the foaming experiments were performed at a temperature of 99° C. and an $N_2$ pressure of 300 bar. A scanning electron micrograph of the foam obtained in this way can be seen in FIG. 19. As can be seen from FIG. 19, a homogeneous foaming of the sample occurred in the system PS/$N_2$ at 99° C. and 300 bar. The average pore size is about 1 µm, which means a significant progress as compared to the previous foams. However, it is also to be mentioned that the material density is very high, and thus the term "foam" can be used here only with limitations. In order to check whether an additional structure is present on the nanometer scale, the material was examined at higher magnifications. These scanning electron micrographs are shown in FIG. 20. Contemplating FIG. 20, it becomes clear that a substructure in the nanometer range in which the original particle structure is clearly recognizable underlies the 1 µm foam. It is seen, especially in FIG. 20 on the right, that the coalesced particles were stretched when the breaking edge was generated. At the material sites not damaged by the breaking of the sample, the particle structure coated with a homogeneous polymer layer is also recognizable.

Example 3

Sub-200 nm Foams

Figure 21:
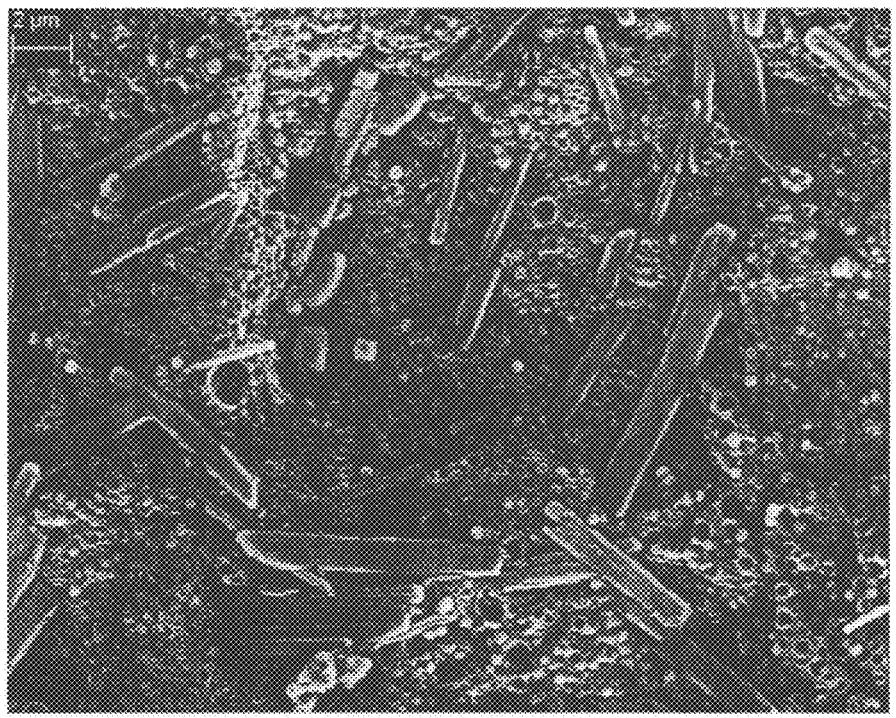
FIG. 21: Scanning electron micrograph of a PMMA foam having a pore diameter of below 200 nm. The impurities on the sample surface originate from the sample preparation process and can be neglected.
Figure 22:
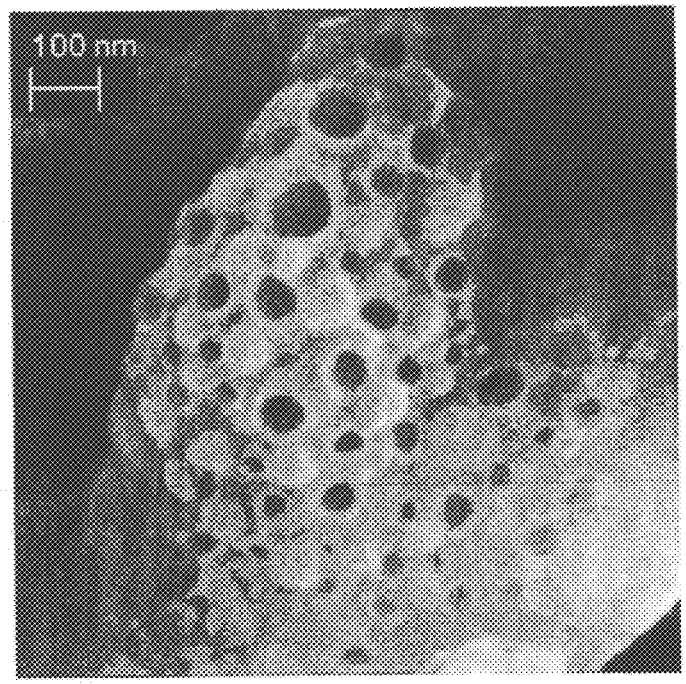
FIG. 22: Scanning electron micrograph of a region of a PMMA foam in which the forming of a foam with a pore size of below 100 nm occurred. In addition, it can be clearly seen from the picture that the foam has a high porosity.

In some of the foaming experiments with the system PMMA/$CO_2$, the formation of polymer foams with pore diameters below 200 nm occurred (FIG. 21), in addition to the results already shown. In addition, FIG. 22 shows that even foams having a pore diameter of below 100 nm and a high porosity were realized. This shows clearly that the production of nanocellular foams having a high porosity is possible according to the invention by the described process.

Example 4

Production of Sugar Foams

In this Example, the sugar balls prepared in the form of a dispersion are dried in a crucible. A packing of the dried sugar balls is then placed into a pressure-resistant container, which is filled with a blowing agent, namely liquid $CO_2$ at room temperature and about 70 bar. Alternatively, any other suitable blowing agent may also be chosen. The blowing agent immediately soaks the ball package and fills the interstices between the balls in fractions of a second.

According to the invention, because of the microporous nature of the packing, only this short period of time is necessary to bring the blowing agent in proximity to and contact with the thermoplastic material to be foamed on a microscopic scale. Now, while the pressure is regulated, the pressure-resistant container is adjusted to the desired temperature before the pressure of the blowing agent is released to normal pressure upon lapse of the regulated heating time, during which the phase-inversion of the discrete sugar balls to a continuous sugar matrix occurs. During this expansion, the viscous sugar matrix in which the blowing agent is in the form of extremely finely dispersed inclusions is foamed.

The invention claimed is:

1. A process for producing a porous material containing homogeneous gas-containing inclusions having an average size of below 1 µm, comprising:
   (a) providing a compact packing of starting material corresponding to the porous material, said compact packing being a matrix of individual particles of the starting material in contact with one another, wherein the starting material is a thermoplastic polymer obtainable by emulsion polymerization; and the individual particles are spheres with particle radii of from 20 to 500 nm;
   (b) adding a supercritical gas or supercritical mixture of gases;
   (c) surpassing a glass transition temperature ($T_g$) of the starting material with continuity inversion; and
   (d) releasing to atmospheric pressure and solidifying by falling below the $T_g$ of the starting material.

2. The process according to claim 1, wherein:
   (i) said surpassing of and falling below the glass transition temperature ($T_g$) of the starting the material is effected by heating or cooling, respectively; or
   (ii) said surpassing of the glass transition temperature ($T_g$) of the starting material is caused partially or completely by reducing the $T_g$ when the supercritical gas is added, and said falling below the glass transition temperature ($T_g$) of the starting material is caused partially or completely by said releasing to atmospheric pressure.

3. The process according to claim 1, wherein said supercritical gas (i) is a gas or mixture of gases that leads to a reduction of $T_g$ when added to the starting material; and/or (ii) is added at a pressure of from 10 to 300 bar and at a temperature of from 0 to 200° C.

4. The process according to claim 1, wherein a volume fraction of the gas-containing inclusions in the total volume of the material is from 0.1 to 90%.

5. A process for producing a porous material comprising homogeneous gas-containing inclusions having an average size of below 1 µm, said process comprising:
   (a) compactly packing a starting material to be converted by the process to the porous material, the starting material comprising individual particles contacting adjacent particles in such a way that particulate matter consisting of said individual particles is surrounded by a continuous void;
   (b) introducing at least one supercritical gas to form a first intermediate material, wherein the supercritical gas fills the continuous void, and the first intermediate material comprises the individual particles as a discontinuous phase within a continuous phase of the supercritical gas;
   (c) raising the temperature of the first intermediate material beyond the glass transition temperature ($T_g$) of the first intermediate material to cause a continuity inversion and to form a second intermediate material, wherein the individual particles coalesce during the continuity inversion into a matrix that forms a continuous phase in the second intermediate material, and the gas forms bubbles that constitute a discontinuous phase within said matrix; and
   (d) reducing to atmospheric pressure and lowering the temperature of the second intermediate material below the glass transition temperature ($T_g$) of the second intermediate material to solidify and yield said porous material.

6. A process for producing a porous material containing homogeneous gas-containing inclusions having an average size of below 1 µm, comprising:
   (a) providing a compact packing of starting material corresponding to the porous material, said compact packing being a matrix of individual particles of the starting material in contact with one another, wherein the starting material is a thermoplastic polymer selected from a group consisting of polystyrenes and poly(meth)acrylates;
   (b) adding a supercritical gas or supercritical mixture of gases;
   (c) surpassing the glass transition temperature ($T_g$) of the starting material with continuity inversion; and
   (d) releasing to atmospheric pressure and solidifying by falling below the $T_g$ of the starting material.

7. The process according to claim 6, wherein said thermoplastic material is selected from a group consisting of polystyrene, polystyrene substituted at a benzene ring, polystyrene substituted at a vinylic double bond, polyacrylate and polymethacrylate.

8. The process according to claim 6, wherein said thermoplastic material is a polystyrene and said supercritical gas is $CO_2$ and $N_2$ (at a mixing ratio of from 0 to 100% by volume), and in step (b) said supercritical gas has a pressure of from $p_c$ to 300 bar.

9. The process according to claim 6, wherein said thermoplastic material is a polymethacrylate and said supercritical gas is $CO_2$ and $N_2$ (at a mixing ratio of from 0 to 100% by volume), and in step (b) said supercritical gas mixture has a pressure of from $p_c$ to 300 bar.

* * * * *